Patented Sept. 24, 1946

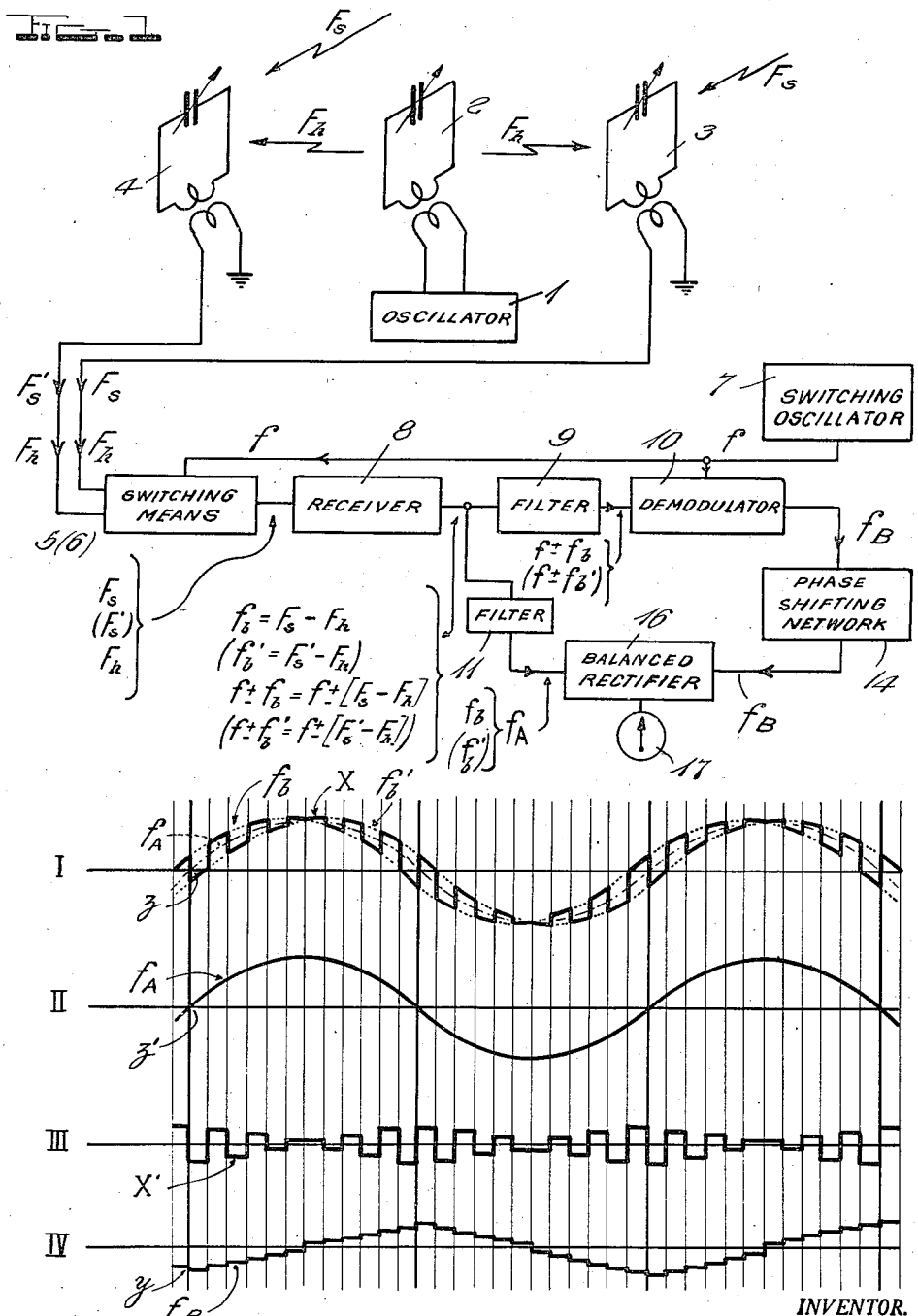

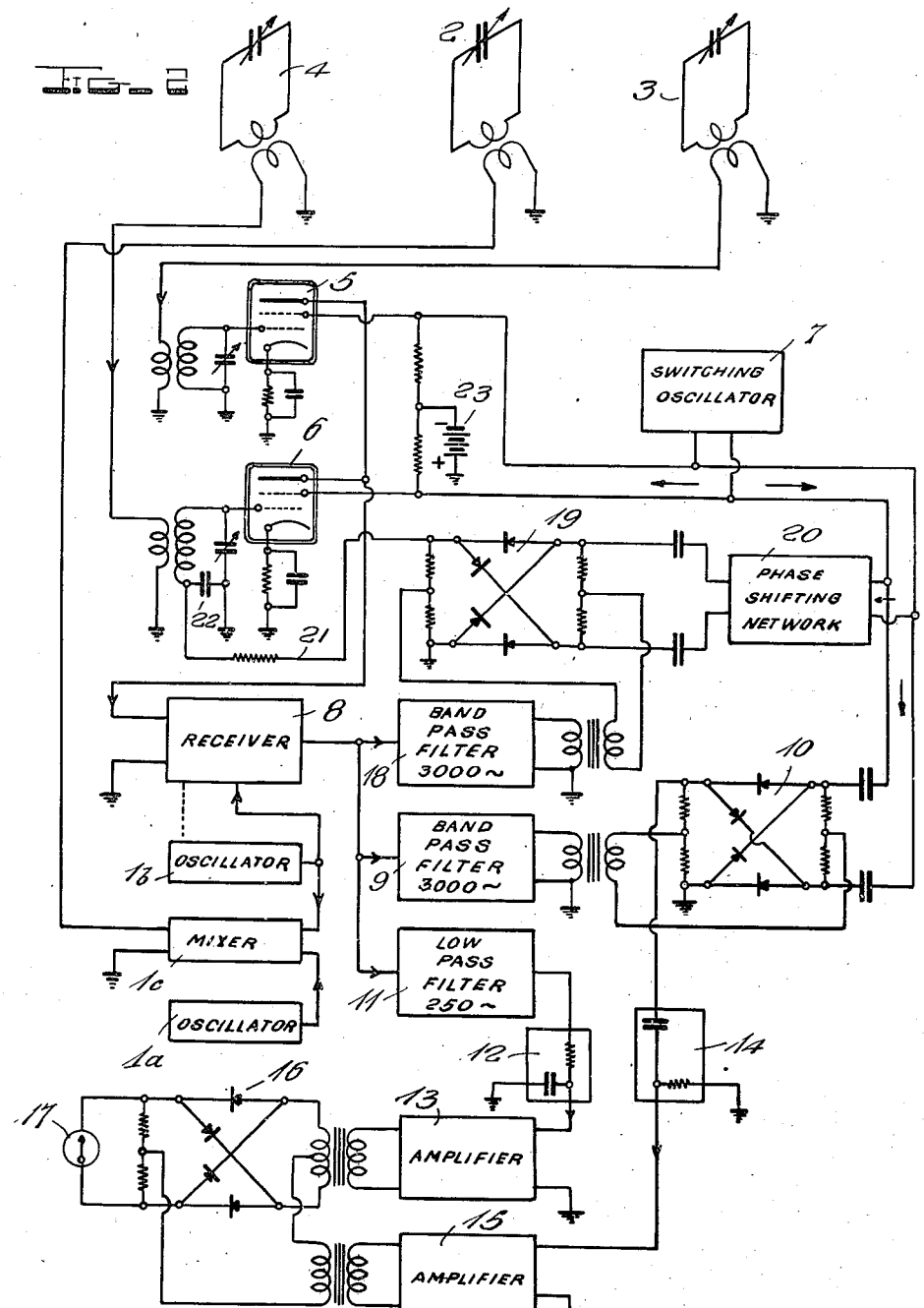

2,408,122

UNITED STATES PATENT OFFICE 2,408,122

HETERODYNE DIRECTION FINDER WITH SINGLE RECEIVER

Walter H. Wirkler, Cedar Rapids, Iowa, assignor to Collins Radio Company, Cedar Rapids, Iowa, a corporation of Iowa Application November 15, 1940, Serial No. 365,826

16 Claims. (Cl. 250—11)

This invention relates broadly to radio direction finders, and more specifically to direction finders of the heterodyne type in which the indication is based on the phase relationship between audio frequency modulation products of a locally generated wave radiated from an injection antenna, and a signal wave arriving from a distance.

One object of this invention is to provide an indication of the relative phase of the received signal voltage in two spaced antennas by means of a single receiver alternately connected to each antenna at a switching frequency which is higher than the low frequency modulation product resulting from the heterodyning action between the distant signal and the local oscillator.

Another object of this invention is to provide automatic differential gain control action between the two antenna circuits, based on the presence of switching frequency components in the output of a single receiver channel.

A further object of my invention is to provide a heterodyne radio direction finding system employing a single radio receiver, alternately connected with separate receiving antennas, and a novel arrangement for providing currents of comparable phase for determining phase differences indicative of direction.

Still another object of my invention is to provide a heterodyne radio direction finding system employing a single radio receiver, electronically coupled alternately with separate receiving antennas at a predetermined switching frequency, and an intermodulation arrangement involving components of the switching frequency and the heterodyne beat frequency for providing a current proportional to the phase difference between the instantaneous currents from the receiver, for indicating direction.

Other and further objects of my invention reside in the system and circuit arrangements hereinafter described with reference to the accompanying drawings in which:

Figure 1 is a block diagram illustrating the basic arrangement of elements in the system of my invention; Fig. 2 is a schematic diagram of one embodiment of my invention, following the arrangement of Fig. 1 and incorporating additional features, such as the automatic differential volume control, for improved operation; and Fig. 3 comprises theoretical wave form diagrams of voltages in different portions of one circuit connected with the output of the receiver, for directional indications.

Direction finders of the heterodyne type have certain inherent advantages with respect to phase shift in independently tuned antenna circuits which have been completely described in my copending application Serial No. 294,522, filed September 12, 1939, for Radio direction finding system, and in a number of related applications. It is the object of this invention to retain the advantages of the heterodyne method while using only a single receiver channel instead of a separate receiver channel for each antenna circuit as in the cases mentioned above. Direction finders not of the heterodyne type commonly use a single receiver channel cooperatively energized by two receiving antennas which are connected directly to the receiver at all times, although some use a single receiver alternately switched to the two receiving antenna circuits. Since the switching frequency in this arrangement must, of necessity, be much lower than the signal frequency, the indication of phase difference between currents in the two antenna circuits is effective during only a small fraction of the total number of signal frequency cycles, and the directional sensitivity of such a device is relatively poor in terms of signal-to-noise ratio.

The signal frequency in the system of my invention is reduced on the heterodyne principle to a beat frequency with respect to which the switching frequency is made relatively high, for example, a beat frequency of 250 cycles may be employed with a switching frequency of 3000 cycles; the theoretical wave form diagrams of Figs. 3 and 4 are drawn accordingly. The frequencies must be always sufficiently different for separation in filters, the switching frequency being invariably greater than the beat frequency.

In Fig. 1, I have indicated a local oscillator 1 differing in frequency from the signal frequency by a low audio beat frequency, an injection antenna 2 for inducing equally into receiving antenna circuits 3 and 4 voltages at the local oscillator frequency, and switching means at 5, (6), which alternately supply the input of a receiver 8 with energy from antenna circuits 3 and 4. The antennas are switched alternately by means of switching frequency voltage from switching oscillator 7. The audio output voltage from receiver 8 is supplied through frequency selective network 9 to a demodulator or rectifier 10. Network 9 selects modulation components in a frequency band centered on the switching frequency of 3,000 cycles per second. Rectifier 10 is supplied also with switching frequency voltage directly from oscillator 7. The output of rectifier 10, as it appears at phase shifting network 14, will contain voltage of beat frequency when a phase difference exists between the signal frequency voltages at antenna circuits 3 and 4 as explained below. The audio output voltage from receiver 8 is also supplied to frequency selective network 11 which selects currents of beat frequency for application with the output of the rectifier 10, in proper phase, to the balanced rectifier 16 for deriving an indicating voltage.

In Fig. 3, at I, curve $f_b$ represents the audio output of receiver 8 when the receiver is continuously connected to antenna 3 for example. Curve $f_b'$ represents the output of receiver 8 when its input is continuously connected to antenna 4. Curves $f_b$ and $f_b'$ have been drawn with a slight phase displacement such as would exist when the signal is arriving from the direction different from a perpendicular to a line joining the two antennas. Under the action of switching voltage from oscillator 7, the input of receiver 8 will be connected alternately to the two antennas so that the audio output voltage from receiver 8 may be expected to look something like the curve X, the solid line in the group at I, Fig. 3. Network 11 in selecting currents of beat frequency delivers an output wave $f_A$ which is substantially the average of the curve X; the curve $f_A$ is shown in full line at II, Fig. 3.

Network 9 in selecting sideband components around the switching frequency can be thought of as passing an alternating current of wave form somewhat similar to the curve X' at III, Fig. 3. Rectifier 10 can be thought of as a reversing switch operating synchronously with switching voltage alternations from 7. Hence, the wave at III, Fig. 3, when rectified in 10, might be expected to look something like the curve $f_B$ at IV, Fig. 3. Curve $f_B$ at IV is seen to contain a component of beat frequency displaced approximately 90 degrees in time phase from the beat frequency component $f_A$ directly obtained from the output of the receiver. This beat frequency component $f_B$ from rectifier 10 is therefore passed through phase shifting network 14, in order that the component $f_B$ may be applied to rectifier 16, Fig. 1, in phase with the beat frequency component $f_A$ received from the output of receiver 8 through low pass filter 11. The output of the rectifier 16 is applied to indicating means at 17. Rectifier 16 will produce D.-C. output voltage proportional to the phase differences between the signal voltages in antennas 3 and 4 as evidenced by the beat frequency component $f_B$, and of polarity indicating the sense of this phase difference as evidenced by the polarity of the $f_B$ component with respect to that of the $f_A$ component.

In Fig. 1, I have indicated the high frequency signal and heterodyne waves as $F_s$ and $F_h$, respectively, with $F_h$ components being supplied to receiver 8 with $F_s$ components from antenna 3 and $F_s'$ components from antenna 4, alternately. In the receiver 8, the primary function is the mixing of the signal and heterodyne components to produce beat frequencies $f_b$ and $f_b'$, corresponding in phase to the signal components $F_s$ and $F_s'$, respectively. At the same time, receiver 8 operates to produce beat frequency components as sidebands of the switching frequency. In the output of receiver 8, filter 11 averages the primary beat frequency waves $f_b$ and $f_b'$ and passes the resultant wave $f_A$ to the balanced rectifier 16. Filter 9, also connected with the output of the receiver, passes the sideband components centered on the switching frequency $f$, the output being as represented at III, Fig. 3. After demodulation at 10 with the aid of current from the switching oscillator, the wave of beat frequency $f_B$ is established as at IV, Fig. 3, the phase of which is of particular interest.

From Fig. 3, it will be noted that the peak $y$ of the $f_B$ wave coincides in phase with the intermediate nodal point $z$ between the phase displaced waves of beat frequency $f_b$ and $f_b'$, which corresponds to the actual node $z'$ of the average wave $f_A$, wherefore the $f_B$ wave is 90° out of phase with the average wave $f_A$ of beat frequency. Through phase shifting means 14, the resultant wave of beat frequency $f_B$ is shifted substantially 90° in phase, whereupon this component of beat frequency $f_B$ and the component $f_A$ delivered from filter 11 are applied to the balanced rectifier 16 essentially in phase, and a direct current voltage is obtained proportional to the amplitude of the $f_B$ component and of polarity corresponding to the sense of $f_B$ as referred to $f_A$, the average or composite wave of beat frequency.

The significant component $f_B$ is zero when the directional components $f_b$ and $f_b'$ are in like phase, and there is then no voltage output from rectifier 16. The component $f_B$ appears upon the occurrence of any out of phase relation of components $f_b$ and $f_b'$, and the output of rectifier 16 assumes a value proportional to the out of phase relation. It might be again noted that low pass filter 11, operating at the low beat frequency, receives portions of the beat frequency waves $f_b$ and $f_b'$ alternately at the switching frequency, and effectively alleviates the pulsating character of the waves so that a substantially continuous, composite wave of beat frequency is delivered for coaction in the rectifier 16 with the continuous wave $f_B$ derived from both the $f_b$ and $f_b'$ components through the rectifier 10.

Referring now to Fig. 2, the same general circuit arrangement shown in Fig. 1 is evident in the provision of antennas 2, 3 and 4 coupled respectively to a source of injection energy 1a—1c and switching means 5 and 6; switching oscillator 7, which may be of any suitable form; receiver 8, shown as of the superheterodyne type; filters 9 and 11; rectifiers 10 and 16; phase shifting means at 14, which is supplemented by phase shifting means 12 in the connection from filter 11; and the indicating means 17. The switching means are disclosed as multi-grid electron tubes biased to cut-off by a source of potential 23 but alternately operable under the action of the control voltage from switching oscillator 7 to energize the receiver. The rectifier 10 is of the doubly balanced or "ring" type, and is supplied with components of switching frequency from oscillator 7 in phase with the components of like frequency delivered from the band pass filter 9. Sideband components of the beat frequency (IV in Fig. 3), are thus detected and supplied, through phase shifting means 14 and such amplification means at 15 as may be required, to the rectifier 16 which is also of the doubly balanced or "ring" type.

The low pass filter 11 is connected with rectifier 16 through phase shifting means 12 and such amplification means at 13 as may be required. The phase shifting means 12 and 14 are complementary in character, and together effect the substantially 90° phase adjustment of the beat frequency component $f_B$ with respect to the composite average wave $f_A$. Rectifier 16 operates at the beat frequency and delivers direct current for operation of the meter means shown at 17 as a result of an out of phase relationship in the beat frequency components $f_b$ and $f_b'$, evidenced through $f_B$ and corresponding to a like relationship in the signal components $F_s$ and $F_s'$, as hereinbefore explained, for indicating distance.

Rectifier 16 depends for operation upon beat frequency current of proper phase character from rectifier 19 through network 14. This current ($f_B$) is present only when there is a phase inequality between the currents $f_b$ and $f_b'$. Hence the zero-center D.-C. meter indicator 17 shows a deflection only when the antenna system is rotated off bearing, the sense of said indication showing the direction of this off-bearing rotation. The meter shown at 17 represents one type of indicating means adaptable to the system of my invention, but it will be understood that oscilloscopic or other equivalent means may be employed, as desired.

In the direction finder here described, the two beat frequency components applied to 16 are obtained effectively through different channels. That applied to amplifier 13, for example, is directly the output voltage from the receiver; while that obtained from 15 is passed through the receiver as sidebands around the switching frequency before being converted to current of beat frequency. The result is that the relative phase delay of these two currents is rather indeterminate and it is essential that a rather high order of amplitude equality exist between signal currents from the two antenna circuits. For this reason automatic differential gain control means are provided. The output of receiver 8 will contain components of switching frequency depending on the amplitude difference between carrier or $F_h$ currents from 3 and 4, as distinguished from the sideband components around the switching frequency which indicate phase difference between the two signal currents. The switching frequency components resulting from amplitude difference are passed through a narrow band pass filter 18 to rectifier 19. Rectifier 19 also receives switching frequency components directly from oscillator 7, through phase shifting network 20. The result is that a direct voltage of suitable polarity is obtained from the output of 19 and applied as gain control voltage to tube 6 through lead 21, the arrangement including blocking condenser 22. A high order of differential gain control can be obtained by inserting an audio frequency amplifier between 18 and 19.

No modulation sidebands are found in the rectifier 19 as in the rectifier 10, even when the signal components are out of phase, because the band width of filter 18 is limited so that only components of switching frequency may pass, and accordingly the output of rectifier 19 is a direct current resulting from rectification of carrier energy, as distinguished from the alternating current of beat frequency present as a sideband and detected in rectifier 10. That is, when an amplitude difference exists between the carrier voltages received from the two antenna circuits, the D.-C. output from the receiver fluctuates in synchronism with the switching operation. Rectifier 19, considered as a synchronously operating reversing switch, will then have in its output a D.-C. component, the polarity of which depends on which of the two antenna circuits delivers the stronger carrier voltage. Such D.-C. voltage will be suitable for the differential gain correcting function operating on the grid bias voltage of switching tube 6.

I prefer the arrangement shown for obtaining current to be introduced into injection antenna 2. By this arrangement, the local injected frequency as it appears in the intermediate frequency channel of the receiver will be constant and independent of the receiver tuning, and hence its phase delay—and the envelope phase delay for sidebands around this locally introduced frequency—will be constant as far as the intermediate frequencies are concerned, and the adjustment of the phase shifting network 20 will be more nearly independent of receiver tuning.

This is effected, as shown in Fig. 2, by employing a mixer circuit $1c$ to feed the injection antenna 2, and supplying the mixer $1c$ with energy from oscillator $1a$ of fixed frequency and oscillator $1b$ which is also the conversion oscillator for the superheterodyne receiver 8. Oscillator $1a$ operates at a frequency differing from the intermediate frequency of the receiver by the beat frequency $f_b$. The frequency of the energy supplied to the injector loop has a frequency $F_h$ differing from the signal frequency $F_s$ by the desired beat frequency over the tuning range, and its intermediate frequency remains constant, due to the interrelation of the conversion frequency of oscillator $1b$, as disclosed.

While I have disclosed my invention in certain general and preferred embodiments, various modifications may be made therein and I desire it understood that no limitations upon my invention are intended thereby but only by the scope of the appended claims.

What I claim as new and desire to secure by Letters Patent of the United States is as follows:

1. In a heterodyne radio direction finding system, in combination: a directional antenna system, including a pair of signal receiving antennae and a locally energized injector antenna coupled in like relation to both said receiving antennae; a receiving circuit including detector means; switching means for connecting said receiving circuit alternately with each of said receiving antennae for producing heterodyne output beat frequency components, derived in said detector means from received signal energy and energy from said injector antenna, and varying in phase relation as the signals received at the respective receiving antennae; said beat frequency components being interrupted at the frequency of said switching means and constituting amplitude modulation sidebands of the switching frequency proportional in amplitude to the phase relation of said beat frequency components; means for detecting said modulation sidebands for producing a beat frequency current proportional in amplitude to the phase relation of said received signals; said beat frequency components, pulsating at said switching frequency, comprising together a continuous wave constituting an average beat frequency current of effectively fixed phase; balanced rectifier means cooperatively energized by both said beat frequency currents in substantially like phase for producing a direct voltage proportional to the phase relation of said received signals, and direction indicating means energized by said direct voltage.

2. In a heterodyne radio direction finding system, the combination set forth in claim 1 wherein the switching frequency is greater than said beat frequency, and including filter means between said receiving circuit and the means for detecting said modulation sidebands, said filter means being tuned to pass sideband energy centered on said switching frequency, and additional filter means connected with the output of said receiving circuit for selectively passing and integrating the components of beat frequency comprising said average beat frequency current of effectively fixed phase.

3. In a heterodyne radio direction finding system, the combination set forth in claim 1 wherein the detected beat frequency current and the average beat frequency current, as produced, are in phase quadrature; and including phase shifting means for aligning said currents in like phase for cooperatively energizing said balanced rectifier means.

4. In a heterodyne radio direction finding system, the combination set forth in claim 1 wherein said switching means includes an electron tube amplifier in circuit with each receiving antenna, and a control oscillator connected with each electron tube amplifier for blocking the transfer of energy alternately from the respective antennae.

5. In a heterodyne radio direction finding system, the combination set forth in claim 1 wherein said switching means includes an electron tube amplifier in circuit with each receiving antenna, and a control oscillator connected with each electron tube amplifier for blocking the transfer of energy alternately from the respective antennae; and means for detecting the modulation sidebands of said switching frequency having a connection with said control oscillator for receiving current of switching frequency from said oscillator in proper phase for detecting said modulation sidebands.

6. In a heterodyne radio direction finding system, the combination set forth in claim 1 wherein said switching means includes an electron tube amplifier in circuit with each receiving antenna, and a control oscillator connected with each electron tube amplifier for blocking the transfer of energy alternately from the respective antennae; and including in said combination filter means connected with the output of said receiving circuit for selectively passing components of switching frequency resulting from difference in amplitude of carrier energy in the input of said receiving circuit, means for rectifying said components of switching frequency for producing a direct voltage proportional to said amplitude difference, and means for controlling the gain in one said electron tube amplifier in accordance with the magnitude of the last said direct voltage.

7. In a heterodyne radio direction finding system, in combination: a directional antenna system, including a pair of signal receiving antennae and a locally energized injector antenna coupled in like relation to both said receiving antennae; a receiving circuit including detector means; switching means for connecting said receiving circuit alternately with each of said receiving antennae, for producing heterodyne output beat frequency components varying in phase relation as the signals received at the respective receiving antennae; means for deriving from said beat frequency components, interrupted at the switching frequency, a beat frequency current proportional in amplitude to the phase relation of said received signals; means for integrating said beat frequency components, pulsating at the switching frequency, to produce an average beat frequency current of fixed phase; balanced rectifier means cooperatively energized by both said beat frequency currents in like phase for producing a direct voltage proportional to the phase relation of said received signals and direction indicating means energized by said direct voltage.

8. In a heterodyne radio direction finding system wherein directional indications are dependent upon the phase relation of two independent signal currents, means including a single receiving circuit for providing components of said currents in alternate periods at a rate substantially higher than the frequency of said currents; means for integrating said components, to produce an average current of fixed phase; means for detecting the differential of successive components, to produce a separate current proportional in amplitude to the phase relation of said two independent signal currents; and means cooperatively energized by said average current and said separate current, in like phase, for producing a direct voltage proportional to the phase relation of said independent signal currents, for directional indications; the polarity of said direct voltage being dependent on the sense of the differential of the successive components, as detected relative to the fixed phase of said average current.

9. In a heterodyne radio direction finding system wherein directional indications are dependent upon the phase relation of two independent signal currents, means for producing said currents as impulses occurring in successive periods at a frequency substantially greater than that of said currents, means for integrating said impulses to produce an average current of fixed phase, means for detecting the differential of successive impulses to produce a separate current proportional in amplitude to the phase relation of said two independent signal currents, and means cooperatively energized by said average current and said separate current in like phase for producing a direct voltage proportional to the phase relation of said independent signal currents and of a polarity dependent upon the sense of the differential of the successive impulses as detected with respect to the fixed phase of said average current, for directional indications.

10. In a heterodyne radio direction finding system wherein directional indications are dependent upon the phase relation of two independent signal currents, in combination, means for producing said currents as impulses occurring in successive periods at a frequency substantially greater than that of said currents, means for deriving from said impulses a first substantially continuous current of fixed phase as the average of said current impulses and a second substantially continuous current dependent upon the phase relation of said independent signal currents in amplitude and polarity, and means for indicating the amplitude of said second current, and its polarity in reference to the polarity of said first current of fixed phase, for determining direction.

11. In a heterodyne radio direction finding system, the combination set forth in claim 10 and including automatic differential gain control means operative to maintain said independent signal currents equal in amplitude prior to the operation of the first said means.

12. In a heterodyne radio direction finding system, in combination: a directional antenna system including a pair of signal receiving antennae and a locally energized injector antenna coupled in like relation to both said receiving antennae; a receiving circuit including detector means; switching means for connecting said receiving circuit alternately with each of said receiving antennae for producing independent heterodyne output beat frequency currents as impulses occurring in successive periods at said switching frequency, said currents being derived in said detector means from received signal energy and energy from said injector antenna and varying in phase relation as the signals received at the respective receiving antennae; means for integrating said impulses to produce an average current of fixed phase; means for detecting the differential of successive impulses to produce a separate current proportional in amplitude to the phase relation of said independent heterodyne beat frequency currents; balanced rectifier means cooperatively energized by said average current and said separate current in like phase for producing a direct voltage proportional to the phase relation of said received signals; and direction indicating means energized by said direct voltage.

13. In a heterodyne radio direction finding system, the combination set forth in claim 12 wherein said switching means includes an electron tube amplifier in circuit with each receiving antenna, and a control oscillator connected with each electron tube amplifier for blocking the transfer of energy alternately from the respective antennae.

14. In a heterodyne radio direction finding system, the combination set forth in claim 12 wherein said switching means includes an electron tube amplifier in circuit with each receiving antenna, and a control oscillator connected with each electron tube amplifier for blocking the transfer of energy alternately from the respective antennae; and including in said combination separate means for detecting the differential of rectified carrier energy in successive periods at the output of said receiving circuit for producing a direct voltage proportional to said differential, and means for controlling the gain in one said electron tube amplifier in accordance with the magnitude of the last said direct voltage.

15. In a heterodyne radio direction finding system wherein directional indications are dependent upon the phase relation of two independent signal currents, in combination, means for producing said currents as impulses occurring in successive periods at a frequency substantially greater than that of said currents, means for deriving from said impulses a substantially continuous current dependent upon the phase relation of said independent signal currents in amplitude and polarity, means for combining said successive impulses for producing a substantially continuous wave of effectively fixed phase, and means for indicating the amplitude of said continuous current, and its polarity in reference to the polarity of said continuous wave of effectively fixed phase, for determining direction.

16. In a heterodyne radio direction finding system, the combination set forth in claim 10 including means for producing phase quadrature relation of the first and second currents, and phase shifting means for aligning the currents in like phase for cooperatively energizing the indicating means.

WALTER H. WIRKLER.